Feb. 10, 1948.   A. D. HERMAN ET AL   2,435,834
POWER TRANSMISSION
Filed Jan. 5, 1946    2 Sheets-Sheet 1
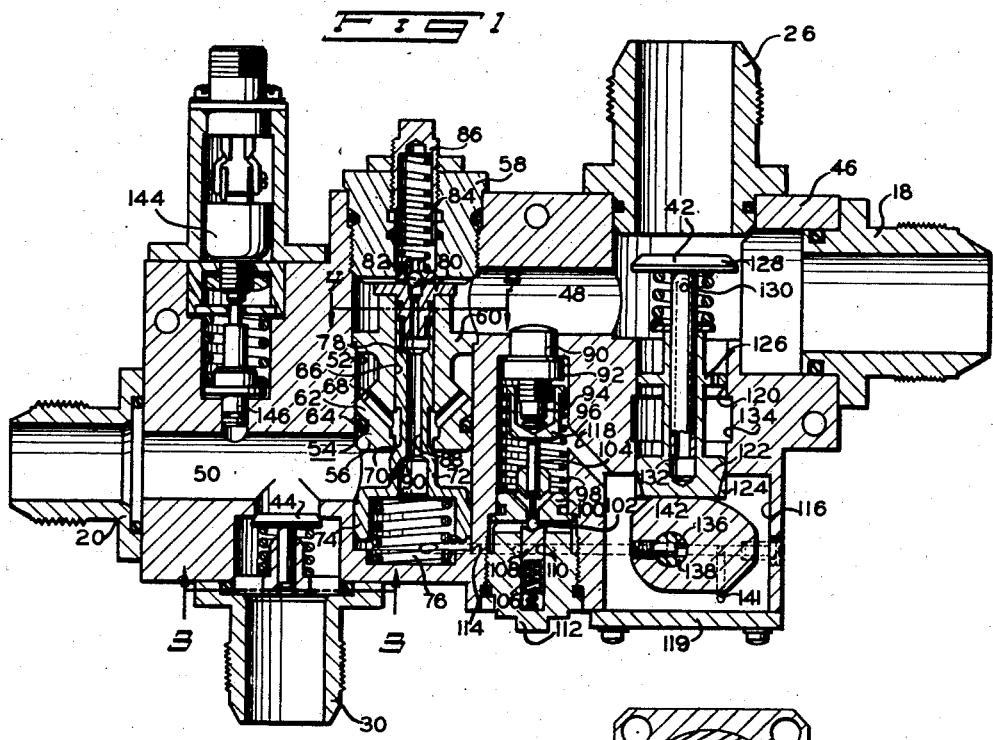
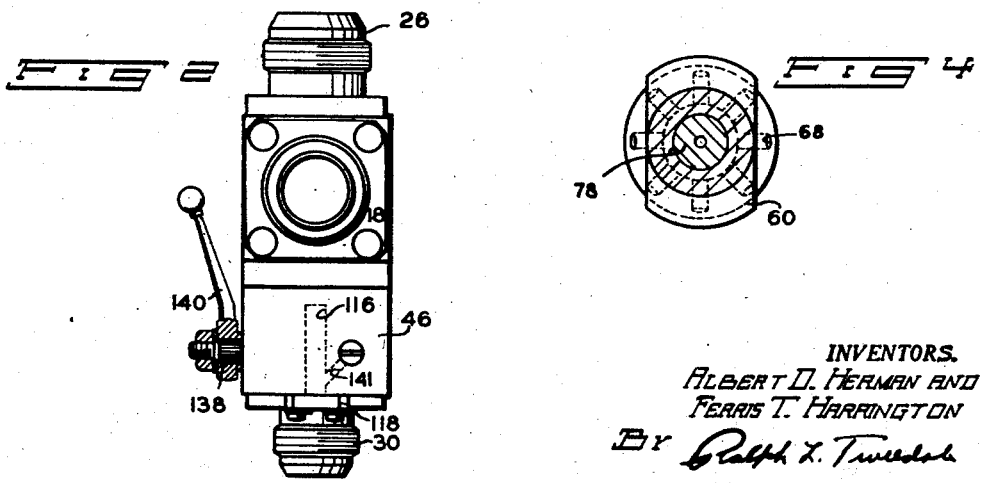
INVENTORS.
ALBERT D. HERMAN AND
FERRIS T. HARRINGTON
BY Ralph L. Tweedale
ATTORNEY

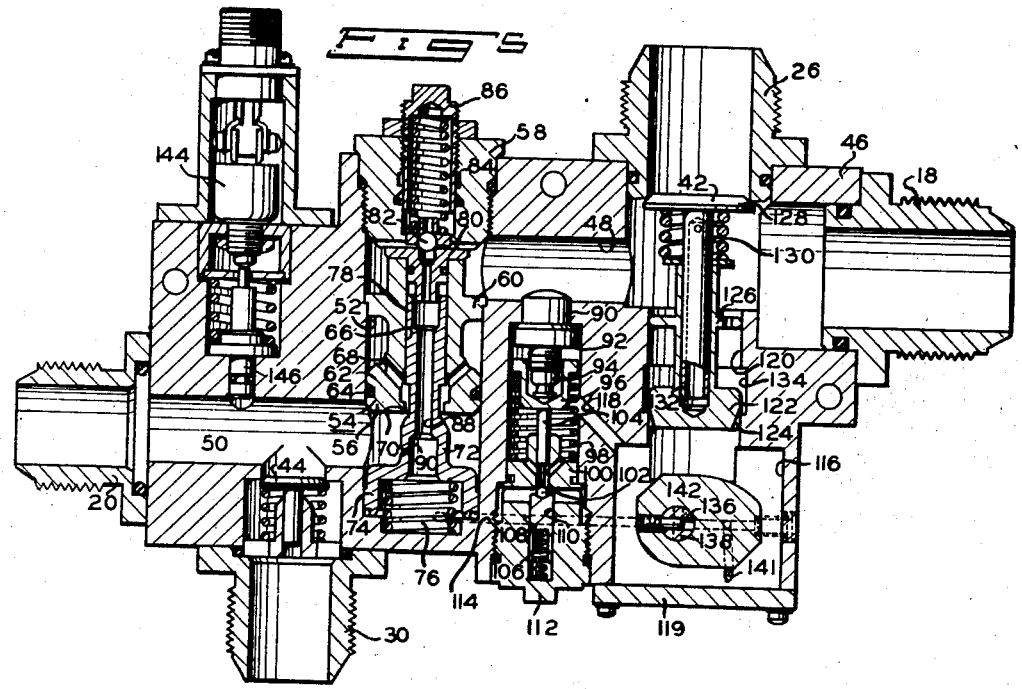
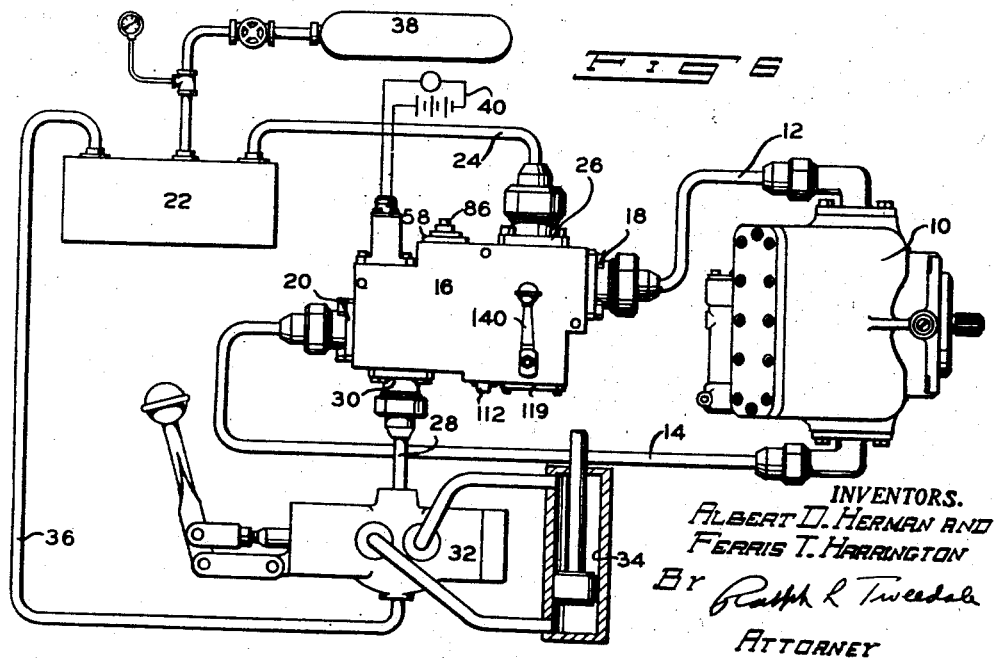

Patented Feb. 10, 1948

2,435,834

UNITED STATES PATENT OFFICE 2,435,834

POWER TRANSMISSION

Albert D. Herman, Encino, Calif., and Ferris T. Harrington, Detroit, Mich., assignors to Vickers Incorporated, Detroit, Mich., a corporation of Michigan Application January 5, 1946, Serial No. 639,312

19 Claims. (Cl. 103—41)

1

This invention relates to power transmissions, particularly to those of the type comprising two or more fluid pressure energy translating devices one of which may function as a pump and another as a fluid motor.

The invention is more particularly concerned with a hydraulic power transmission system particularly adapted for safety in use against overload and fire hazard, and which is eminently suitable for use aboard aircraft although not limited to such applications.

It is an object of the present invention to provide an improved valve assembly for use in a power transmission system which is responsive both to overload conditions and to dangerous temperatures in the fluid within the system for rendering the system safe and for isolating from the remainder of the circuit those portions of the circuit where dangerous conditions may exist.

In the use of hydraulic power transmission systems aboard multi-engine aircraft, it is customary to provide a plurality of engine driven hydraulic pumps, each driven by a different engine and located in close proximity thereto. Particularly in large craft, the entire hydraulic system involves long circuit lines and many utilization elements, and the entire oil capacity of the system is rather large. Occasionally trouble is encountered in one engine or one pump, and dangerously high temperatures are developed which, if not isolated from the remainder of the system, may exceed the flash point of the oil and incur the hazard of fire spreading throughout the hydraulic system.

It is an object of the present invention to provide a compact unitary valve block associated with each pump which is responsive both to overload pressures and to unsafe high temperatures for isolating that pump from the remainder of the system and for, at the same time, unloading the pump to eliminate overheating of the same.

It is a further object of the present invention to provide a pressure responsive relief valve of the pilot controlled type wherein means are provided, upon the occurrence of a sustained overload, for completely unloading the pump independently of pressure conditions.

Further objects and advantages of the present invention will be apparent from the following description, reference being had to the accompanying drawings wherein a preferred form of the present invention is clearly shown.

In the drawings:

Figure 1 is a longitudinal sectional view of a

2 valve block incorporating a preferred form of the present invention and showing the parts in normal operating condition.

Figure 2 is an end view of the valve shown in Figure 1.

Figure 3 is a fragmentary sectional view on the line 3—3 of Figure 1.

Figure 4 is a fragmentary sectional view on line 4—4 of Figure 1.

Figure 5 is a view corresponding to Figure 1 showing the parts in the position occupied when the valve is unloading the pump.

Figure 6 is a diagrammatic view of a power transmission system incorporating a preferred form of the present invention.

Referring first to Figure 6, there is shown a pump 10 having an inlet conduit 12 and a delivery conduit 14 which are connected to a valve block 16 at the ports 18 and 20 thereof. An oil reservoir 22 is connected to the valve block 16 by a conduit 24 at a port 26 while a work circuit having a pressure line 28 is connected to the valve block 16 at the port 30. The work circuit is represented diagrammatically by a four-way valve 32 and a fluid motor 34, together with a return line 36 for conducting spent oil to the reservoir 22. The reservoir 22 may be supercharged by an air bottle indicated at 38. A warning indicating circuit is indicated diagrammatically at 40 to be controlled by switch means later to be described and incorporated in the valve block 16.

Referring now to Figure 1, the pump inlet port 18 is in communication with the reservoir port 26 through the medium of a check valve 42. Likewise, the pump delivery port 20 is in communication with the work circuit port 30 by means of a check valve 44. The body 46 is provided with a bore 48 in line with port 18 and a second bore 50 in line with a port 20.

These bores are connected by a vertical bore 52 in which is mounted a pilot controlled relief valve generally designated as 54. The latter comprises an insert 56 positioned in the bore 52 and retained in position by an end plug 58. The insert 56 has a flange 60 which is flattened down on two sides, as shown in Figure 4, and has an enlarged portion 62 provided with a seal 64 which snugly fits the bore 52. A central bore 66 communicates with the bore 52 through a series of diagonal passages 68 and provides at its lower end a seat 70 which is adapted to be closed by a main relief valve 72. Valve 72 has a control piston 74 slidable in the lower end of the bore 52 and urged upwardly by a light spring 76. The valve 72 also has a small balancing piston 78 slidable in the bore 66.

Pressed in the upper end of the bore 66 is a pilot valve seat 80 on which a ball pilot valve 82 rests under the urge of an adjustable control spring 84; the latter being adjustable by means of a hollow adjusting screw 86. The main relief valve 72 is provided with a central internal passage 88 which is in communication with the passage 50 by a small hole 90.

With pilot valve 82 closed, the main relief valve 72 is substantially balanced as to fluid pressures acting on all of its surfaces, consequently, it is held in engagement with seat 70 by spring 76. It will be seen that the pump delivery in conduit 50 is transmitted through hole 90 to the space beneath piston 74 and also through the central bore 88 of valve 72 to the lower surface of the ball valve 82. Whenever this pressure exceeds the setting of spring 84, valve 82 will lift exhausting oil from the chamber beneath piston 74 at a faster rate than it can enter through the restricted orifice 90. Thereupon, the high pressure acting on the upper surface of piston 74 overcomes the force of spring 76 forcing the valve 72 downwardly and relieving oil from passage 50 into bore 66 and through passages 68 to the bore 52 and bore 48. This action is that of a well-known pilot operated relief valve and serves to maintain the pressure in passage 50 below a predetermined maximum.

It is well known that the relieving of any substantial volume of oil through a relief valve of any character from a high pressure down to a low pressure involves a generation of heat and, if continued for too long a period, will raise the oil temperature to an unsafe value. In order to prevent this action, the present invention provides means for sensing the generation of unsafe temperatures in the oil passing through the relief valve 54 and for, thereupon, completely unloading the pump at negligible delivery pressure so long as high temperature conditions exist.

For this purpose an expansible temperature responsive capsule 90 is mounted in a stepped bore 92 opening into the bore 48. Capsule 90 has its projecting expansible member 94 in abutment with a retainer member 96 for the reception of a spring 98. Positioned at the bottom of bore 92 is a valve seat 100 having a small ball valve 102 seated on the bottom thereof and adapted to be pushed off its seat by means of a plunger 104 which is contacted by the retainer 96 on a predetermined downward movement thereof. A light spring 106 and follower 108 urge the ball 102 onto its seat, and for this purpose are slidably mounted in a bore 110 provided in a plug 112 closing the lower end of bore 92. The lower face of valve seat 100 communicates with the control chamber beneath piston 74 of relief valve 54 through a longitudinal passage 114. The space in bore 92 above seat 100 communicates with a chamber 116 by means of a passage 118.

The chamber 116 is closed by an end cap 119. A bore 120 in line with reservoir port 26 communicates between bore 48 and chamber 116. Check valve 42 is slidable in bore 120 and has a piston 122 at its lower end provided with tapered metering grooves 124 together with a guide flange 126 at its intermediate portion. The head 128 of check valve 42 has a hollow stem 130 which is slidable in a bore 132 formed in the lower section of the valve which carries piston 122 and guide flange 126. The bore 120 has an enlarged port 134 which, when the piston 122 has risen a certain amount from the position shown in Figure 1 will communicate with chamber 116 by means of the tapered grooves 124.

For the purpose of manually unloading the pump 10 independently of pressure or temperature condition, there is provided a manual venting valve 136 forming part of a transverse shaft 138 which extends outside the body for the reception of a suitable control handle 140. The passage 114 intersects the shaft 138 and extends past the same by means of a branch passage 141 into the chamber 116. When the shaft 138 is in the position shown, the valve 136 blocks the passage 114, and when rotated 90 degrees counter-clockwise, the valve 136 opens the passage 114 permitting oil to vent from the chamber beneath control piston 74 to the chamber 116. The shaft 138 also carries a cam 142 which is adapted to lift the piston 122 whenever the shaft 138 is rotated.

For the purpose of providing visual or audible warning that the pump 10 is unloaded for any reason, there is provided a pressure operated switch 144 of the normally closed type. A spring loaded plunger 146 is mounted adjacent to bore 50, and, whenever the pressure in bore 50 is above a predetermined minimum, plunger 156 will be raised opening the switch 144 and consequently opening the indicator circuit 40. Whenever the pressure in bore 50 falls below this minimum however, plunger 146 will drop closing switch 144 and giving a visual indication at the circuit 40.

In operation with the system filled with oil, and with pump 10 operating, the normal condition of the parts are indicated in Figure 1. Relief valve 54 is closed, the temperature responsive venting valve 102 is closed as is also the manual venting valve 136. Likewise the pressure switch 144 has its plunger 146 raised opening the indicator circuit. Should it be desired to manually unload pump 10, the control handle 140 may be shifted counter-clockwise to open the vent valve 136 which will vent the space beneath control piston 74 permitting relief valve 70 to open fully and by-pass oil from the pump outlet through bore 50, valve 54, bore 48 back to the pump inlet. At the same time, cam 142 will raise piston 122 closing check valve 42 to isolate the pump inlet from the reservoir 22. Since the pump 10 is no longer delivering oil to the work circuit, check valve 44 will close thus isolating the work circuit from the pump. Under these conditions the pump 10 operates idly under no load and is completely isolated from the remainder of the system.

On the other hand, with the system operating normally, should an overload develop, relief valve 54 will open in the manner previously described and will pass whatever oil is required from bore 50 to bore 48 without, however, dropping the pressure in bore 50 but merely preventing it from exceeding a certain maximum. When any substantial quantity of oil is thus relieved from bore 50 over a continuous period considerable heating of the oil ensues and the temperature of the oil in bore 48 will rise causing the capsule 90 to expand and lift the valve 102 from its seat. This opens a further passage from the chamber beneath piston 74 through passage 114, vent valve 102, and passage 118 to chamber 116. Momentarily there is no exit from chamber 116 since piston 122 completely blocks the bore 120, however, the piston 122 offers little resistance to upward movement and the oil discharged from beneath piston 74 raises piston 122 to close the check valve 42. Upon further rising of piston 122, spring 130 is compressed and the tapered grooves 124 open to the enlarged port 134. Thereupon, a free passage is opened to the bore 48 permitting a continuous flow of oil in a small quantity through the passages described. The pressure in chamber 116 will be at a very low value only sufficient to hold the piston 122 raised to the point where grooves 124 open into port 134. Likewise, the pressure in bore 50 which acts on the upper surface of control piston 74 will be only a small amount above the pressure in chamber 116, namely, that amount necessary to overcome the force of the light spring 76. Thus, the pressure in bore 50 and the delivery pressure against which pump 10 operates is lowered to a negligible value and the pump is unloaded. As previously described, check valve 42 isolates the pump inlet from the reservoir and check valve 44 isolates the pump outlet from the work circuit. Upon the fall in pressure in bore 50, plunger 146 will drop thus closing the switch 144 giving an indication of trouble by means of the indicator circuit.

While the form of embodiment of the invention as herein disclosed constitutes a preferred form, it is to be understood that other forms might be adopted, all coming within the scope of the claims which follow.

What is claimed is as follows:

1. In a hydraulic power transmission which may be subjected to hazardous high temperatures and having a pump, a reservoir and a work circuit, the combination of a valve block having separate connections to the pump inlet and the pump outlet, a pressure responsive relief valve normally blocking communication between said pump connections, and means responsive to the fluid temperature for opening said relief valve independently of pressure.

2. In a hydraulic power transmission having a pump, a reservoir and a work circuit, the combination of a valve block having separate connections to the pump inlet and the pump outlet, a reservoir connection normally communicating with the pump inlet connection, a pressure responsive relief valve normally blocking communication between said pump connections, means responsive to the fluid temperature for opening said relief valve independently of pressure, and means operable concurrently with the relief valve for blocking the reservoir from the pump inlet.

3. In a hydraulic power transmission having a pump, a reservoir and a work circuit, the combination of a valve block having separate connections to the pump inlet and the pump outlet, a reservoir connection and a work circuit connection normally communicating respectively with the pump inlet connection and the pump outlet connection, a pressure responsive relief valve normally blocking communication between said pump connections, means responsive to the fluid temperature for opening said relief valve independently of pressure, and means operable concurrently with the relief valve for blocking the pump inlet and outlet from the reservoir and work circuit, respectively.

4. In a hydraulic power transmission having a pump, a reservoir and a work circuit, the combination of a valve block having separate connections to the pump inlet and the pump outlet, a pressure-responsive relief valve normally blocking communication between said pump connections, a pilot relief valve for venting the main relief valve in response to a predetermined pressure rise in the pump outlet, and a temperature-responsive pilot valve for also venting the main relief valve independently of pressure.

5. In a hydraulic power transmission having a pump, a reservoir and a work circuit, the combination of a valve block having separate connections to the pump inlet and the pump outlet, a reservoir connection normally communicating with the pump inlet connection, a pressure responsive-relief valve normally blocking communication between said pump connections, a pilot relief valve for venting the main relief valve in response to a predetermined pressure rise in the pump outlet, a temperature-responsive pilot valve for also venting the main relief valve independently of pressure, and means operable concurrently with the relief valve for blocking the reservoir from the pump inlet.

6. In a hydraulic power transmission having a pump, a reservoir and a work circuit, the combination of a valve block having separate connections to the pump inlet and the pump outlet, a reservoir connection and a work circuit connection normally communicating respectively with the pump inlet connection and the pump outlet connection, a pressure-responsive relief valve normally blocking communication between said pump connections, a pilot relief valve for venting the main relief valve in response to a predetermined pressure rise in the pump outlet, a temperature-responsive pilot valve for also venting the main relief valve independently of pressure, and means operable concurrently with the relief valve for blocking the pump inlet and outlet from the reservoir and work circuit, respectively.

7. In a hydraulic power transmission having a pump, a reservoir and a work circuit, the combination of a valve block having separate connections to the pump inlet and the pump outlet, a pressure responsive relief valve normally blocking communication between said pump connections, a pilot relief valve for venting the main relief valve in response to a predetermined pressure rise in the pump outlet, and a manually operable pilot valve for also venting the relief valve independently of pressure.

8. In a hydraulic power transmission having a pump, a reservoir and a work circuit, the combination of a valve block having separate connections to the pump inlet and the pump outlet, a reservoir connection normally communicating with the pump inlet connection, a pressure responsive relief valve normally blocking communication between said pump connections, a pilot relief valve for venting the main relief valve in response to a predetermined pressure rise in the pump outlet, a manually operable pilot valve for also venting the relief valve independently of pressure, and means operable concurrently with the relief valve for blocking the reservoir from the pump inlet.

9. In a hydraulic power transmission having a pump, a reservoir and a work circuit, the combination of a valve block having separate connections to the pump inlet and the pump outlet, a reservoir connection and a work circuit connection normally communicating respectively with the pump inlet connection and the pump outlet connection, a pressure responsive relief valve normally blocking communication between said pump connections, a pilot relief valve for venting the main relief valve in response to a predetermined pressure rise in the pump outlet, a manually operable pilot valve for also venting the relief valve independently of pressure, and means operable concurrently with the relief valve for blocking the pump inlet and outlet from the reservoir and work circuit, respectively.

10. In a hydraulic power transmission having a pump, a reservoir and a work circuit, the combination of a valve block having separate connections to the pump inlet and the pump outlet, a pressure-responsive relief valve normally blocking communication between said pump connections, means responsive to the fluid temperature for opening said relief valve independently of pressure, and a pressure switch responsive to pressure conditions in the pump outlet for indicating loss of pump pressure.

11. In a hydraulic power transmission having a pump, a reservoir and a work circuit, the combination of a valve block having separate connections to the pump inlet and the pump outlet, a reservoir connection normally communicating with the pump inlet connection, a pressure-responsive relief valve normally blocking communication between said pump connections, means responsive to the fluid temperature for opening said relief valve independently of pressure, means operable concurrently with the relief valve for blocking the reservoir from the pump inlet, and a pressure switch responsive to pressure conditions in the pump outlet for indicating loss of pump pressure.

12. In a hydraulic power transmission having a pump, a reservoir and a work circuit, the combination of a valve block having separate connections to the pump inlet and the pump outlet, a reservoir connection and a work circuit connection normally communicating respectively with the pump inlet connection and the pump outlet connection, a pressure-responsive relief valve normally blocking communication between said pump connections, means responsive to the fluid temperature for opening said relief valve independently of pressure, means operable concurrently with the relief valve for blocking the pump inlet and outlet from the reservoir and work circuits, respectively, and a pressure switch responsive to pressure conditions in the pump outlet for indicating loss of pump pressure.

13. In a hydraulic power transmission having a pump, a reservoir and a work circuit, the combination of a valve block having separate connections to the pump inlet and the pump outlet, a reservoir connection normally communicating with the pump inlet connection, a pressure responsive-relief valve normally blocking communication between said pump connections, a pilot relief valve for venting the main relief valve in response to a predetermined pressure rise in the pump outlet, a temperature-responsive pilot valve for also venting the main relief valve independently of pressure, and means operable concurrently with the relief valve for blocking the reservoir from the pump inlet, said last means including a piston responsive to oil pressure vented from the main relief valve and a valve operated by said piston to close the reservoir connection.

14. In a hydraulic power transmission having a pump, a reservoir and a work circuit, the combination of a valve block having separate connections to the pump inlet and the pump outlet, a reservoir connection normally communicating with the pump inlet connection, a pressure responsive-relief valve normally blocking communication between said pump connections, a pilot relief valve for venting the main relief valve in response to a predetermined pressure rise in the pump outlet, a temperature-responsive pilot valve for also venting the main relief valve independently of pressure, means operable concurrently with the relief valve for blocking the reservoir from the pump inlet, said last means including a piston responsive to oil pressure vented from the main relief valve and a valve operated by said piston to close the reservoir connection, and means operated by the piston for blocking escape of venting fluid until the reservoir blocking valve is substantially closed.

15. In a hydraulic power transmission having a pump, a reservoir and a work circuit, the combination of a valve block having separate connections to the pump inlet and the pump outlet, a reservoir connection normally communicating with the pump inlet connection, a pressure responsive relief valve normally blocking communication between said pump connections, a pilot relief valve for venting the main relief valve in response to a predetermined pressure rise in the pump outlet, a manually operable pilot valve for also venting the relief valve independently of pressure, and means operable concurrently with the relief valve for blocking the reservoir from the pump inlet, said last means including a piston responsive to oil pressure vented from the main relief valve and a valve operated by said piston to close the reservoir connection.

16. In a hydraulic power transmission having a pump, a reservoir and a work circuit, the combination of a valve block having separate connections to the pump inlet and the pump outlet, a reservoir connection normally communicating with the pump inlet connection, a pressure responsive relief valve normally blocking communication between said pump connections, a pilot relief valve for venting the main relief valve in response to a predetermined pressure rise in the pump outlet, a manually operable pilot valve for also venting the relief valve independently of pressure, means operable concurrently with the relief valve for blocking the reservoir from the pump inlet, said last means including a piston responsive to oil pressure vented from the main relief valve and a valve operated by said piston to close the reservoir connection, and means operated by the piston for blocking escape of venting fluid until the reservoir blocking valve is substantially closed.

17. In a hydraulic power transmission having a pump, a reservoir and a work circuit, the combination of a valve block having separate connections to the pump inlet and the pump outlet, a normally-closed valve for blocking communication between the pump connections, pressure responsive means for partially opening said valve when the pump outlet pressure exceeds a predetermined value, and means responsive to a predetermined temperature rise in the fluid passing said valve for opening the valve wider and dropping the pump outlet pressure below said predetermined value whenever the valve is partially opened for a substantial interval.

18. In a hydraulic power transmission having a pump, a reservoir and a work circuit, the combination of a valve block having separate connections to the pump inlet and the pump outlet, a reservoir connection normally communicating with the pump inlet connection, a normally-closed valve for blocking communication between the pump connections, pressure responsive means for partially opening said valve when the pump outlet pressure exceeds a predetermined value, means responsive to a predetermined temperature rise in the fluid passing said valve for opening the valve wider and dropping the pump outlet pressure below said predetermined value whenever the valve is partially opened for a substantial interval, and means operable in response to operation of the temperature responsive means for blocking the reservoir connection from the pump inlet.

19. In a hydraulic power transmission having a pump, a reservoir and a work circuit, the combination of a valve block having separate connections to the pump inlet and the pump outlet, a reservoir connection and a work circuit connection normally communicating respectively with the pump inlet connection and the pump outlet connection, a normally-closed valve for blocking communication between the pump connections, pressure responsive means for partially opening said valve when the pump outlet pressure exceeds a predetermined value, means responsive to a predetermined temperature rise in the fluid passing said valve for opening the valve wider and dropping the pump outlet pressure below said predetermined value whenever the valve is partially opened for a substantial interval, and means operable in response to operation of the temperature responsive means for isolating the pump inlet and outlet from the reservoir and the work circuit, respectively.

ALBERT D. HERMAN.
FERRIS T. HARRINGTON.

REFERENCES CITED

The following references are of record in the file of this patent:

UNITED STATES PATENTS

| Number | Name | Date |
|---|---|---|
| 1,905,284 | Heitger | Apr. 25, 1933 |
| 2,075,498 | Bondurant | Mar. 30, 1937 |
| 2,207,809 | Lauffer et al. | July 16, 1940 |